(12) United States Patent
Rosenberg et al.

(10) Patent No.: US 9,052,475 B2
(45) Date of Patent: Jun. 9, 2015

(54) FIBER OPTICS CONNECTORS

(75) Inventors: Paul Kessler Rosenberg, Sunnyvale, CA (US); Michael Renne Ty Tan, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/234,975

(22) PCT Filed: Jul. 29, 2011

(86) PCT No.: PCT/US2011/045970
§ 371 (c)(1),
(2), (4) Date: Jan. 24, 2014

(87) PCT Pub. No.: WO2013/019189
PCT Pub. Date: Feb. 7, 2013

(65) Prior Publication Data
US 2014/0133803 A1    May 15, 2014

(51) Int. Cl.
*G02B 6/38* (2006.01)
*G02B 6/32* (2006.01)
*G02B 6/36* (2006.01)
(Continued)

(52) U.S. Cl.
CPC . *G02B 6/406* (2013.01); *G02B 6/32* (2013.01); *G02B 6/3825* (2013.01); *G02B 6/3885* (2013.01); *G02B 6/4249* (2013.01); *G02B 6/4292* (2013.01); *G02B 6/322* (2013.01)

(58) Field of Classification Search
CPC ...... G02B 6/3885; G02B 6/32; G02B 6/4249; G02B 6/4204; G02B 6/43; G02B 6/3644; G02B 6/3834; G02B 6/384; G02B 6/3672; G02B 6/3873

USPC .......... 385/33, 54, 55, 60, 61, 71, 72, 74, 78, 385/79, 88; 359/619, 621, 622
See application file for complete search history.

(56) References Cited

U.S. PATENT DOCUMENTS

| | | | |
|---|---|---|---|
| 5,973,844 A | * | 10/1999 | Burger ........................... 359/622 |
| 6,707,613 B2 | * | 3/2004 | Fujimoto et al. ............... 359/622 |
| 6,874,952 B2 | | 4/2005 | Nishimura |

(Continued)

FOREIGN PATENT DOCUMENTS

| CN | 1210595 A | 3/1999 |
|---|---|---|
| CN | 1334472 A | 2/2002 |

(Continued)

OTHER PUBLICATIONS

Hwang, S.H. et al., 120 Gb/s-level VCSEL Array Optical Subassembly Using Passive Alignment Technique, 2008 Electronic Components and Technology Conference, 2008, pp. 1620-1624.

(Continued)

*Primary Examiner* — Robert Tavlykaev
(74) *Attorney, Agent, or Firm* — Hewlett-Packard Patent Department

(57) ABSTRACT

Optical multifiber connectors with multiple termination ferrules and multilens arrays are disclosed. In one aspect, an optical fiber connector includes a multilens array and at least one alignment post. The lenses protrude from a first surface of a transparent plate, and the least one alignment post protrudes from a second surface of the transparent plate opposites the first surface. The connector includes a first standoff frame disposed on the first surface and a second standoff frame disposed on the second surface.

16 Claims, 10 Drawing Sheets

(51) Int. Cl.
*G02B 6/40* (2006.01)
*G02B 6/42* (2006.01)

(56) References Cited

U.S. PATENT DOCUMENTS

| | | | |
|---|---|---|---|
| 6,987,619 | B2 | 1/2006 | Kornrumpf et al. |
| 7,128,474 | B2 * | 10/2006 | Giboney et al. ............... 385/92 |
| 8,079,125 | B2 * | 12/2011 | Ban et al. .................... 29/407.09 |
| 2002/0176172 | A1 * | 11/2002 | Nemoto et al. ............... 359/619 |
| 2003/0113077 | A1 | 6/2003 | Xu et al. |
| 2004/0184738 | A1 * | 9/2004 | McColloch et al. ........... 385/53 |
| 2006/0140544 | A1 * | 6/2006 | Morimoto et al. ............ 385/59 |
| 2008/0008419 | A1 | 1/2008 | Krahenbuhl et al. |
| 2008/0095501 | A1 | 4/2008 | McColloch |
| 2011/0026882 | A1 | 2/2011 | Budd et al. |
| 2011/0063723 | A1 * | 3/2011 | Shyu et al. .................... 359/355 |
| 2011/0103747 | A1 | 5/2011 | Chang et al. |
| 2011/0157723 | A1 | 6/2011 | Hsieh et al. |

FOREIGN PATENT DOCUMENTS

| | | |
|---|---|---|
| CN | 1708708 A | 12/2005 |
| JP | 2003107277 | 4/2003 |
| KR | 10-200000310 | 6/2000 |
| KR | 10-200100843 | 9/2001 |

OTHER PUBLICATIONS

Joining Technologies Between Fiber and Chip Arrays, (Research Paper).
PCT International Search Report, Feb. 22, 2012, Application No. PCT/US2011/045970, Filed Jul. 29, 2011.
Supplementary European Search Report, Dec. 5, 2014, European Patent Application No. 11870224.0, 4 pages.

* cited by examiner

FIBER OPTICS CONNECTORS

BACKGROUND

In recent years, replacing electrical components with optical components in high performance computer systems has received considerable attention, because optical communication offers numerous advantages over electrical communication. Electronic data transmission suffers from degraded signal integrity as data rates and transmission distances increase. Conventional printed circuit board ("PCB") signal traces and electrical connector pins consume large amounts of power and occupy physical space in the system. In addition, it is increasingly difficult to scale the bandwidth of electronic interconnects, and the absolute amount of time (i.e., latency) needed to send electrical signals over an electronic interconnect fabric is too long to take full advantage of the high-speed performance offered by smaller and faster processors. On the other hand, optical fibers offer very large bandwidths. For instance, the optical carrier frequencies can range over $10^{14}$ Hz, and with the use of wavelength division multiplexing ("WDM"), the data rate or information carrying capacity of optical fibers is many orders of magnitude greater than their electrical counterparts. Optical components also provide low transmission loss, enable data to be transmitted with significantly lower power consumption, are immune to cross talk, and are made of materials that do not corrode or emit or absorb external radiation. However, the high cost of many optical components continues to be an impediment to replacing electrical components in many computer or network switching systems. For example, replacing hundreds of electrical interconnects with optical interconnects to connect blades or line cards within the cabinet of a rack mounted computer system is typically cost prohibitive. As a result, manufacturers, designers, and users of large scale computer systems continue to seek lower cost optical components for optical communication.

DETAILED DESCRIPTION

Optical multifiber connectors with multi-fiber ("MF") ferrules and multilens arrays are disclosed. The optical fiber connectors described herein can be used as a low cost, high bandwidth alternative to electronic connectors and certain other types of optical connectors typically used for large data volume communication in computer systems.

Figure 1:
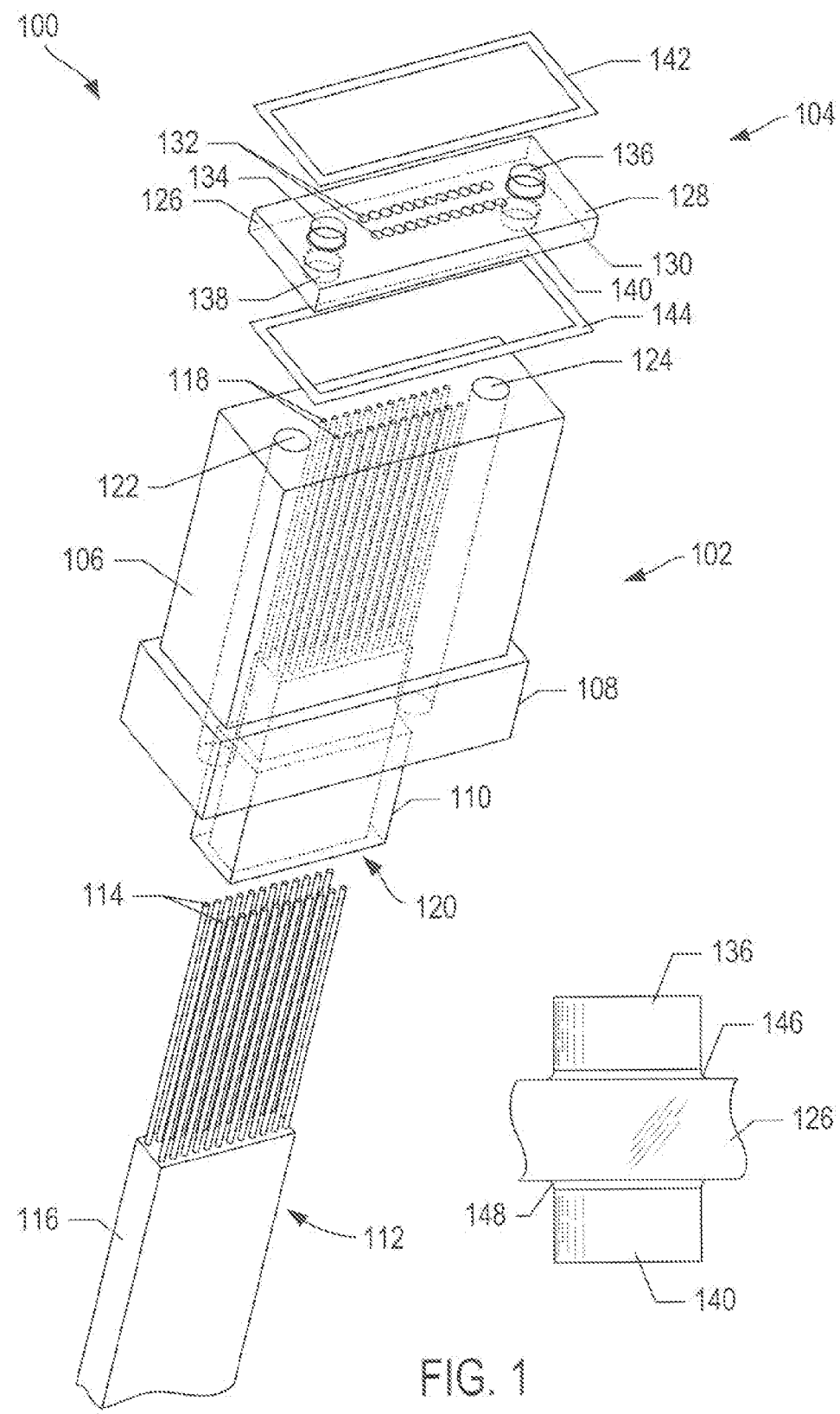
FIG. 1 shows an exploded isometric view of an example optical multifiber connector.

FIG. 1 shows an exploded isometric view of an example optical multifiber connector 100. The connector 100 includes an MF ferrule 102, or an equivalent multi-fiber ferrule, and a multilens array 104. The ferrule 102 includes a housing 106, a raised collar 108 located along the base of the housing 106, and a strain relief boot 110. The ferrule 102 attaches to the end of an optical fiber ribbon cable 112 composed of two-dimensional array of optical fibers 114 encased in a sheath 116. The ferrule 102 includes two rows of twelve cylindrical optical fiber openings 118 to receive the exposed portions of the optical fibers 114 and includes a single slot or channel 120 within the collar 108 and the strain boot 110 to receive the sheath 116 of the optical fiber 112. The ferrule 102 also includes two alignment openings 122 and 124 that partially or fully span the length of the housing 106 and are located at opposite ends of the two rows of optical fiber openings 118.

The housing 106, collar 108, and strain boot 110 can be composed of the same material and fabricated using injection molding. For example, the ferrule 102 can be composed of glass-filled thermoplastics such as liquid crystal polymer. Alternatively, the housing 106 and collar 108 can be composed of glass-filled thermoplastic and the strain boot 110 can be composed of a flexible thermoplastic rubber such as polypropylene vulcanization elastomer. The flexible strain boot 110 material can be partially inserted in the collar 108 and flexes when a load is applied to the cable 112.

The multilens array 104 includes a transparent plate 126 with a first surface 128 and a second surface 130 parallel to and opposite the first surface 128. The multilens array 104 includes a two-dimensional array of twelve lenses 132 disposed on the first surface 128, a first pair of alignment posts 134 and 136 protrude from the first surface 128, and a second pair of alignment posts 138 and 140 protrude from the second surface 130. The multilens array 104 also includes a first standoff frame 142 and a second standoff frame 144. The alignment posts 134, 136, 138, and 140 also include base fillets or a radiused profile where the alignment posts contact the first and second surfaces 128 and 130. For example, FIG. 1 shows a side view of the alignment posts 136 and 140. The alignment post 136 includes a base fillet 146 and the alignment post 140 includes a base fillet 148. The base fillets 146 and 148 are concave extensions of the alignment posts 136 and 140 located where the alignments posts attach to the plate 126. The base fillets effectively increase the durability of the alignment posts by enabling the alignment posts to bear larger loads and strain than the alignment posts would otherwise be able to bear without the base fillets. The fillets are also a feature of certain processes, such as injection molding, used to fabricate the pillars. The standoffs 142 and 144 prevent the base fillets from being damaged during operation as described below.

The lenses 132 and lens substrate 126 can be composed of a transparent material such as optical-grade glass or plastic. The lenses 132 can be co-molded out of plastic with the lens substrate 126. The lenses 132 can also be fabricated from liquid or film polymer which is bonded to the lens substrate 126 in a batch process and subjected to secondary processing, such as photo-masking and exposure to reactive ion etching to produce the desired lens profile. The alignments posts 134, 136, 138, and 140 can be composed of a cured liquid or film adhesive formed on the first and second surfaces 128 and 130. Alternatively, the alignment posts and associated base fillets can be molded at the same time as the lens substrate, and therefore, composed of the same material as the substrate 126. The standoff frames 142 and 144 can be composed of the same material as the substrate 126 or the same material as the lenses 132.

Figure 2:
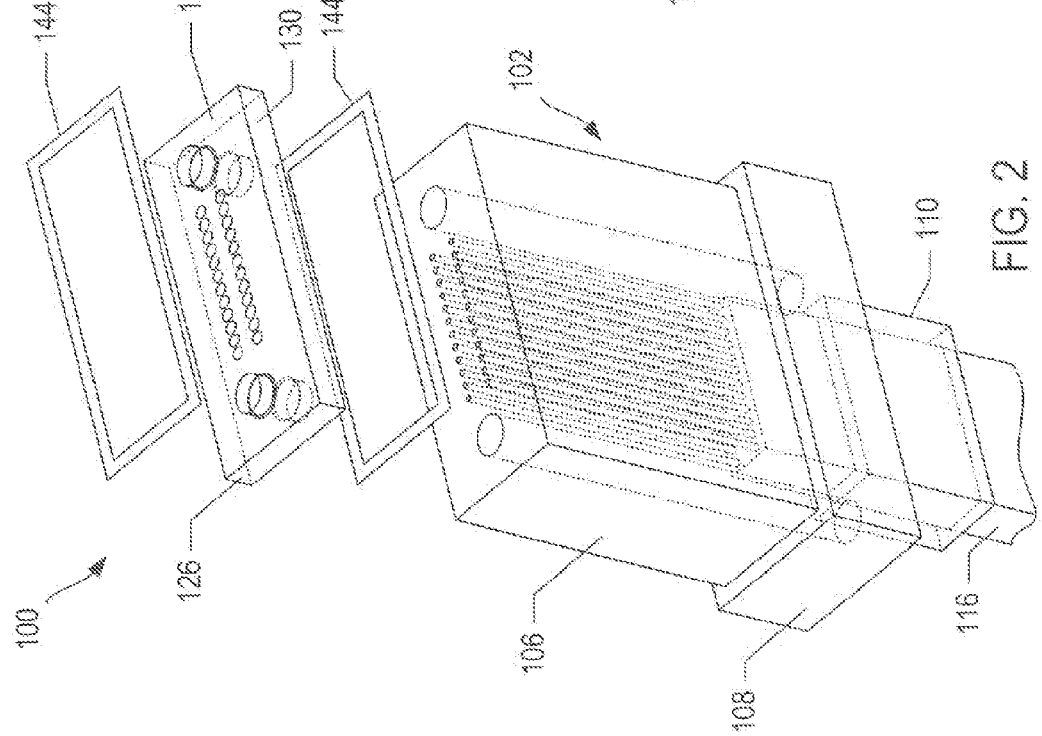
FIG. 2 shows a partially exploded isometric view of the example connector shown in FIG. 1.

FIG. 2 shows a partially exploded isometric view of the example connector 100 with the optical fiber 112 inserted into the ferrule 102 and strain boot 110. Each of the cylindrical optical fibers 114, shown in FIG. 1, is fully inserted into one of the cylindrical optical fiber openings 118, and the sheath 116 is fully inserted into the slot 120 of the strain boot 110 and the collar 108.

Figure 3:
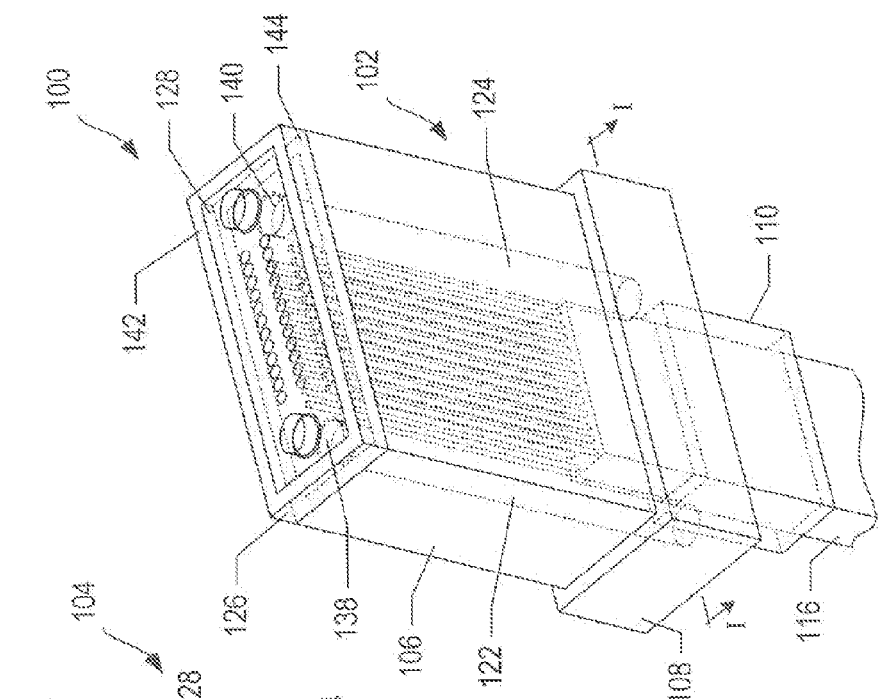
FIG. 3 shows an isometric view of the example connector shown in FIG. 1 fully assembled.

FIG. 3 shows an isometric view of the example connector 100 fully assembled. The alignment posts 138 and 140 are inserted into alignment openings 122 and 124 with the second standoff frame 144 disposed between the second surface of the plate 126 and the end of the housing 106. The first standoff 142 is disposed on the first surface 128 of the plate 126.

Figure 4:
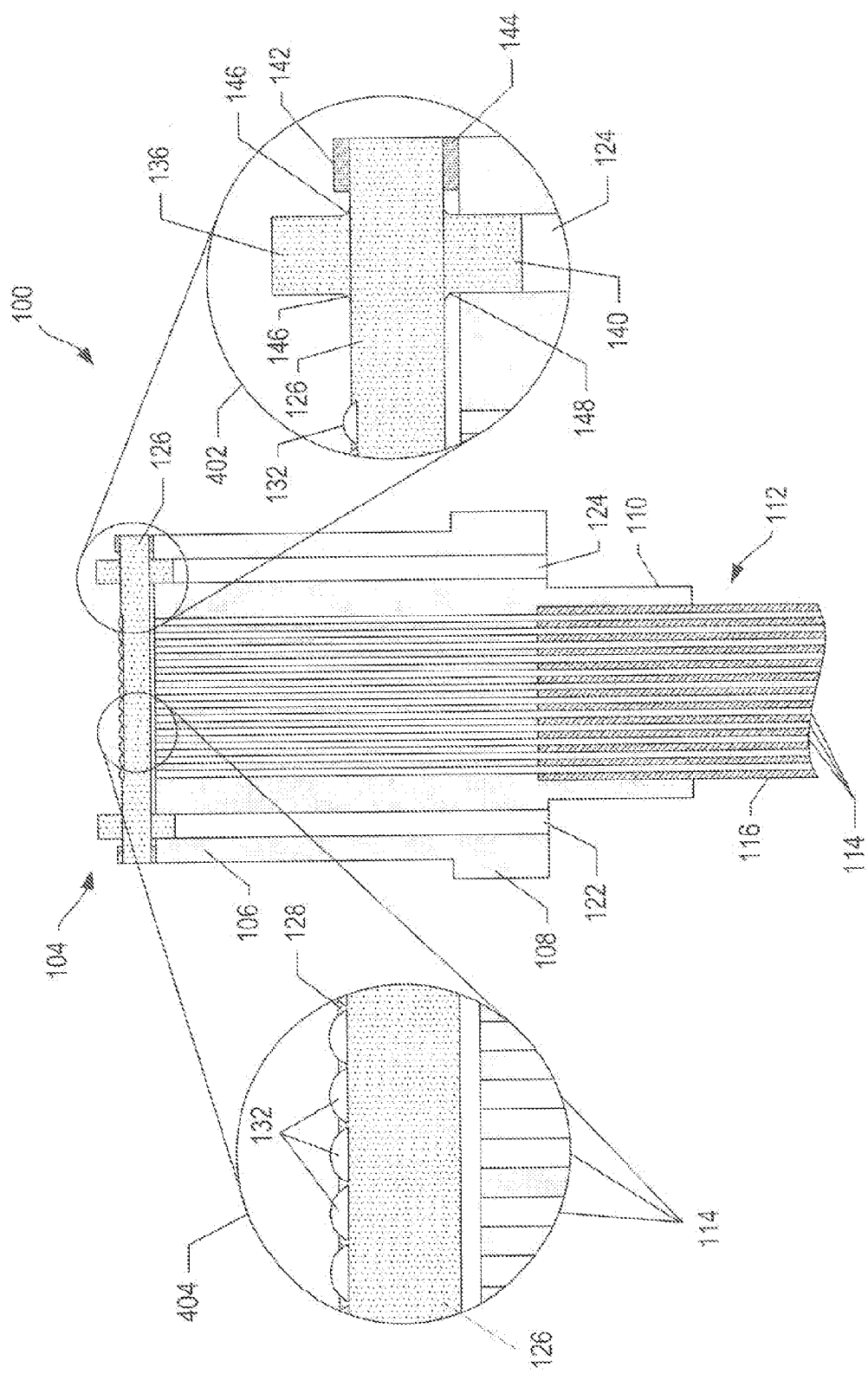
FIG. 4 shows a cross-sectional view of the connector shown in FIG. 3.

FIG. 4 shows a cross-sectional view of the connector 100 along a line I-I shown in FIG. 3. The cross-sectional view reveals one row of twelve optical fibers 114 of the cable 112 located within twelve optical fiber openings of the housing 106. FIG. 4 includes an enlarged view 402 of the alignment posts 136 and 140 with the alignment post 140 inserted into the alignment opening 124. The enlarged view 402 reveals that the thickness of the second standoff frame 144 is selected to prevent the base fillet 148 from being forced into the opening 124, thereby preventing interference between the opening 124 and the fillet 148, preventing damage to the post 140, preventing the post 140 from sticking in the opening 124 and, in the worst case, preventing the post 140 from breaking off of the lens substrate 126. In a similar manner, the thickness of the first standoff frame 142 protects the base fillet 146 of the alignment post 136 and protects the lenses 132 of the lens array when the alignment post 136 is inserted into an alignment opening of another connector or alignment opening of another device as described below. FIG. 4 also includes an enlarged view 404 of a subset of the array of lenses 132 protruding from the first surface 128 of the plate 126. Enlarged view 404 reveals that each optical fiber 114 is aligned with one of the lenses 132 in the lens array.

Optical multifiber connectors are not limited to optical fiber ribbon cables with a two-dimensional array of twelve optical fibers. The optical multifiber connector 100 represents just one example of a connector for optical fiber ribbon cables with twelve optical fibers. Other connectors configured in the same manner can be used to connect optical fiber ribbon cables with only a single row of any number or one-dimensional array of optical fibers or optical fiber ribbon cables with an array of more than two rows of optical fibers. Connectors configured in a same manner can be used to connect optical fiber cables with different arrangements of optical fibers.

Multilens arrays are not limited to a two-dimensional array of lenses. The multilens array 104 represents just one example of a multilens array with twelve lenses. Other multilens arrays configured in the same manner can be used with a one-dimensional array of lenses or with a two-dimensional array composed of more than two rows of lenses. Multilens arrays can also have different arrangements of lens to match the different arrangements of optical fibers.

Multilens arrays are also not limited to a pair of alignment post disposed on a first surface and a pair of alignment posts disposed on a second surface opposing the first surface. The number of alignment posts on each surface can range from as few as a single alignment post to two or more alignment posts, and the number of alignment posts on the first surface can be different than the number of alignment posts on the second surface.

Figure 5A:
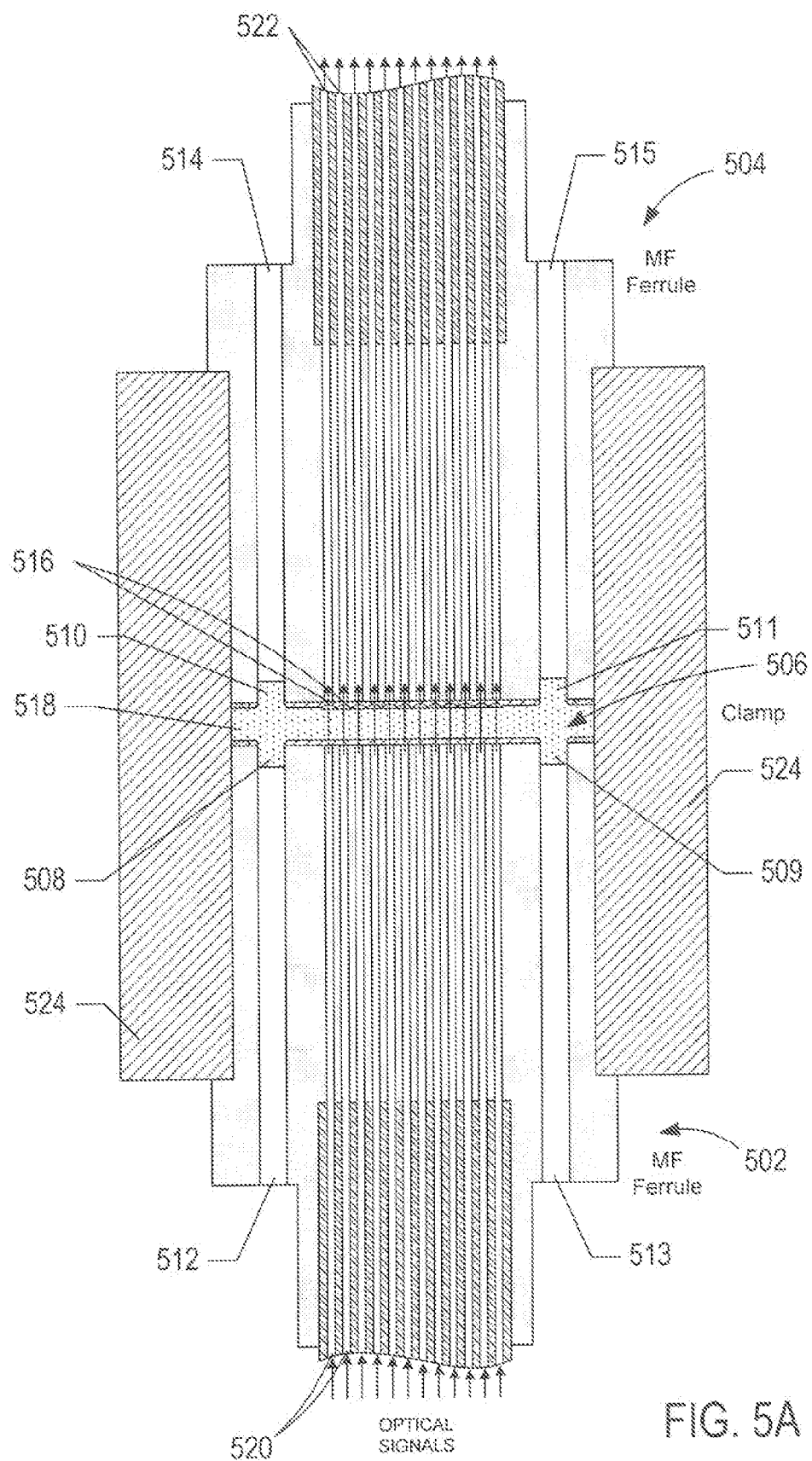
FIGS. 5A-5B show cross-sectional views of examples of mating two multiple termination ferrules.

The multilens array enables a first MF ferrule to be optically connected to a second MF ferrule and maintains alignment of the lenses of the lens standoff, optical fibers of the first MF ferrule, and the optical fibers of the second MF ferrule. As a result, optical signals output from the array of optical fibers of the first MF ferrule can be transmitted directly into corresponding optical fibers of the second MF ferrule. FIG. 5A shows a cross-sectional view of an example of mating a first MF ferrule 502 with a second MF ferrule 504 via a lens standoff 506. The example ferrules 502 and 504 are configured in a similar manner to the ferrule 102. The lens standoff 506 includes alignment posts 508 and 509 inserted into alignment openings 512 and 513 in the ferrule 502 and includes alignment posts 510 and 511 inserted into alignment openings 514 and 515 in the ferrule 504. The standoff 506 also includes an array of collimating lenses 516 protruding from a surface of a transparent plate 518. The alignment posts 508-511 maintain alignment of the optical fibers 520 of the ferrule 502, the lenses 516, and the optical fibers 522 of the ferrule 504. A clamp or clip 524 holds the ferrules 502 and 504 and the lens standoff 506 together. Optical signals are emitted from the optical fibers 520 of the first ferrule 502 as beams of light that pass through the plate 518 and spread out. Each beam is transmitted through a lens 516 of the array of lenses that re-collimates the beam to enter an optical fiber 522 of the second ferrule 504.

Figure 5B:
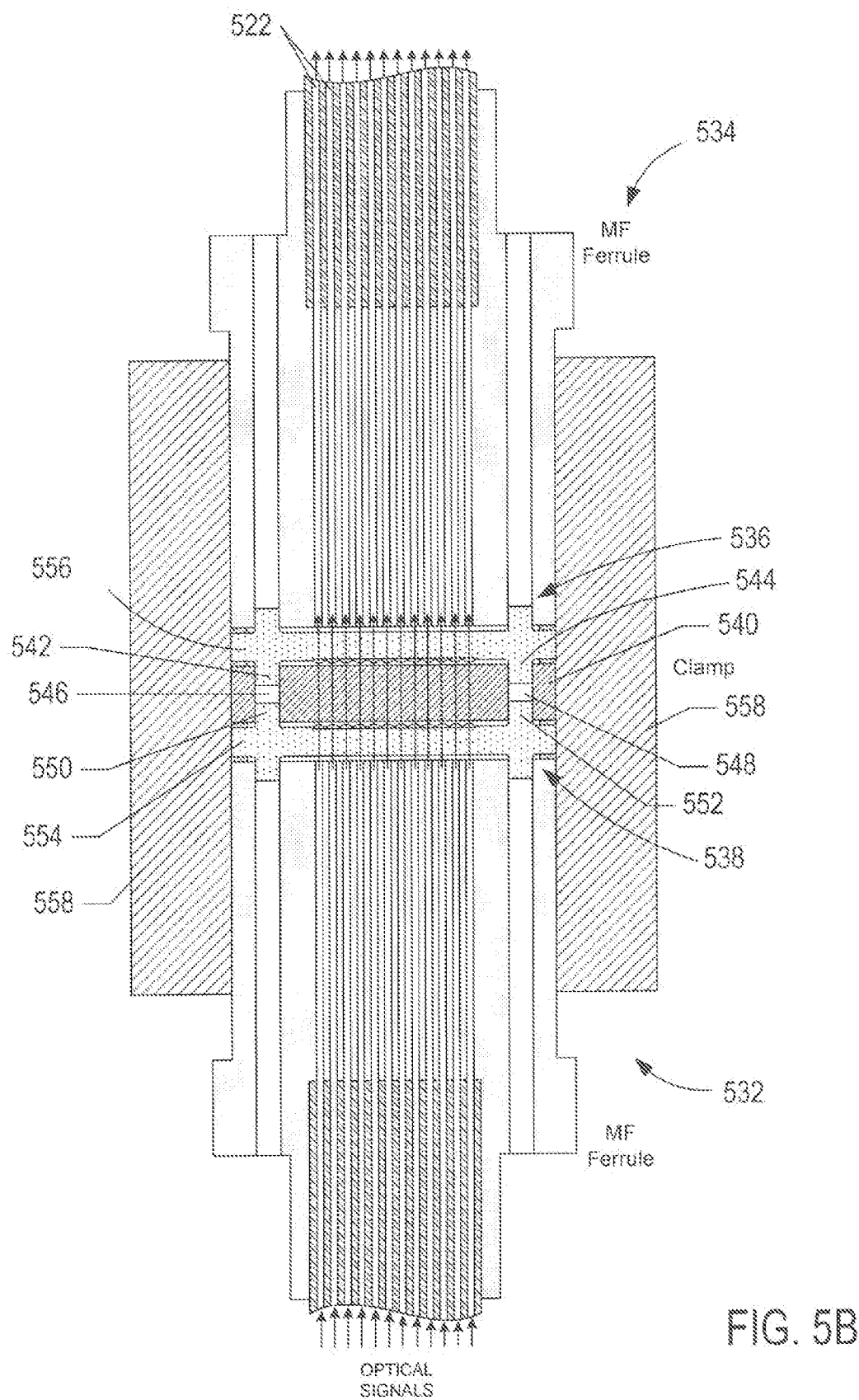

FIG. 5B shows a cross-sectional view of an example of mating a first MF ferrule 532 with a second MF ferrule 534 via two multilens arrays 536 and 538 and a transparent, or aperture, plate 540 separating the standoffs 536 and 538. The example ferrules 532 and 534 are configured in a similar manner to the ferrule 102. The multilens array 536 includes alignment posts 542 and 544 inserted into alignment openings 546 and 548 in the plate 540, and the multilens array 538 includes alignment posts 550 and 552 inserted into the alignment openings 546 and 548 in the plate 540. The multilens arrays 536 and 538 also include opposite facing arrays of collimating lenses protruding from surfaces of transparent plates 554 and 556. The alignment posts maintain alignment of the optical fibers of the ferrules 532 and 534 and the lenses of multilens array 536 and 538. A clamp or clip 558 holds the assembly of ferrules 532 and 534, multilens array 536 and 538, and transparent plate 540 together.

Figure 6A:
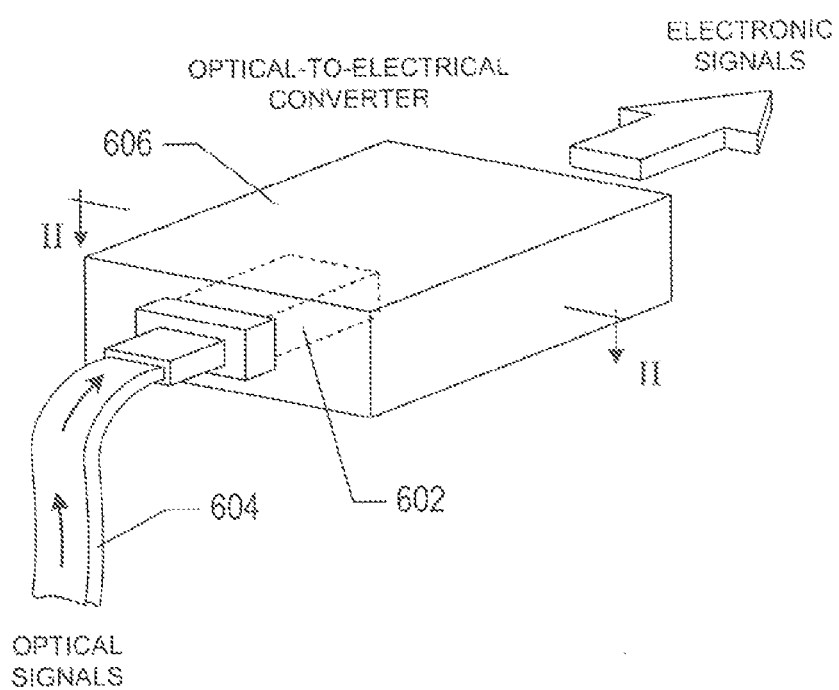
FIG. 6A shows an example of an optical multifiber connector that connects an optical fiber ribbon cable to an optical-to-electrical converter.
Figure 6B:
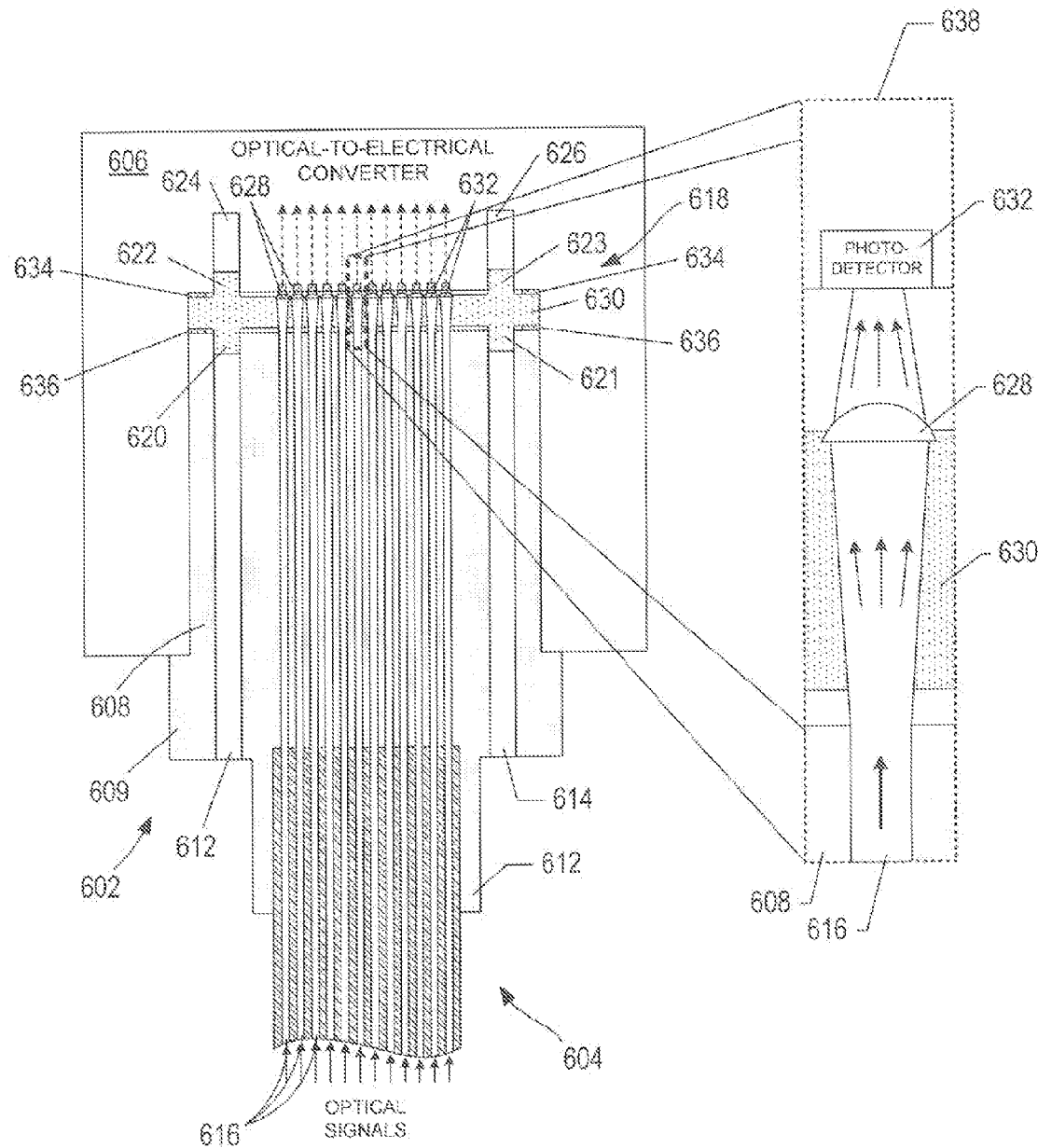
FIG. 6B shows a cross-sectional view of the connector shown in FIG. 6A.

Optical multifiber connectors can be used to connect an optical fiber ribbon cable to an optical-to-electrical ("OE") converter or connect an optical fiber ribbon cable to an electrical-to-optical ("EO") converter. FIG. 6A shows an example of a connector 602 that connects an optical fiber ribbon cable 604 to an OE converter 606. Optical signals enter the connector 602 via the cable 604 and are converted by the converter 606 into electronic signals that can be processed or stored by a processor or memory connected to the converter 606. FIG. 6B shows a cross-sectional view of the connector 602 inserted into the converter 606 along a line II-II shown in FIG. 6A. In the example of FIG. 6B, the connector 602 is configured in a similar manner to the connector 102. The connector 602 includes a housing 608, a collar 609, and a strain boot 610. The housing 608 includes alignment openings 612 and 614 and optical fiber openings to receive the optical fibers 616 of the cable 604. The connector 602 also includes a multilens array 618 with alignment posts 620 and 621 inserted into alignment openings 612 and 614 and alignment posts 622 and 623 inserted into alignment openings 624 and 626 of the converter 606. Focusing lenses 628 protrude from a surface of a transparent plate 630 and positioned opposite the ends of the fibers 616. The alignment posts 620-623 maintain alignment of the optical fibers 616, the lenses 628, and an array of photodetectors 632. A first standoff frame 634 protects the base fillet of the alignment posts 622 and 623 and protects the lenses 628 of the lens array, and a second standoff frame 636 protects the base fillets of the alignment posts 620 and 621. Optical signals are emitted from the optical fibers 616 as beams of light that pass through the plate 630 and spread out. As shown in enlarged view 638, each beam is transmitted through a lens 628 of the array of lenses that focuses the beam onto one of the photodetectors 632. Each photodetector converts an optical signal output from an optical fiber into an electronic signal that can be amplified and transmitted to other electronic components.

Figure 7A:
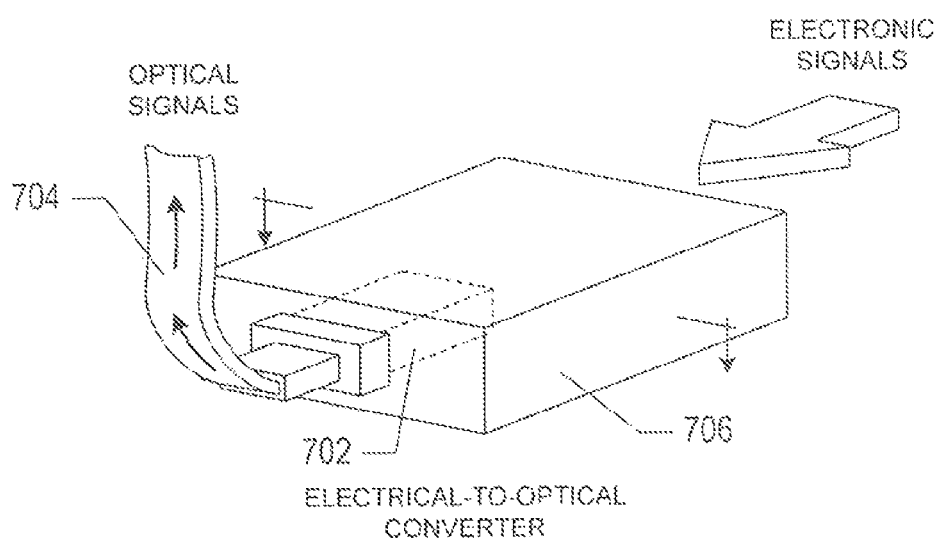
FIG. 7A shows an example of an optical multifiber connector that connects an optical fiber ribbon cable to an electrical-to-optical converter.
Figure 7B:
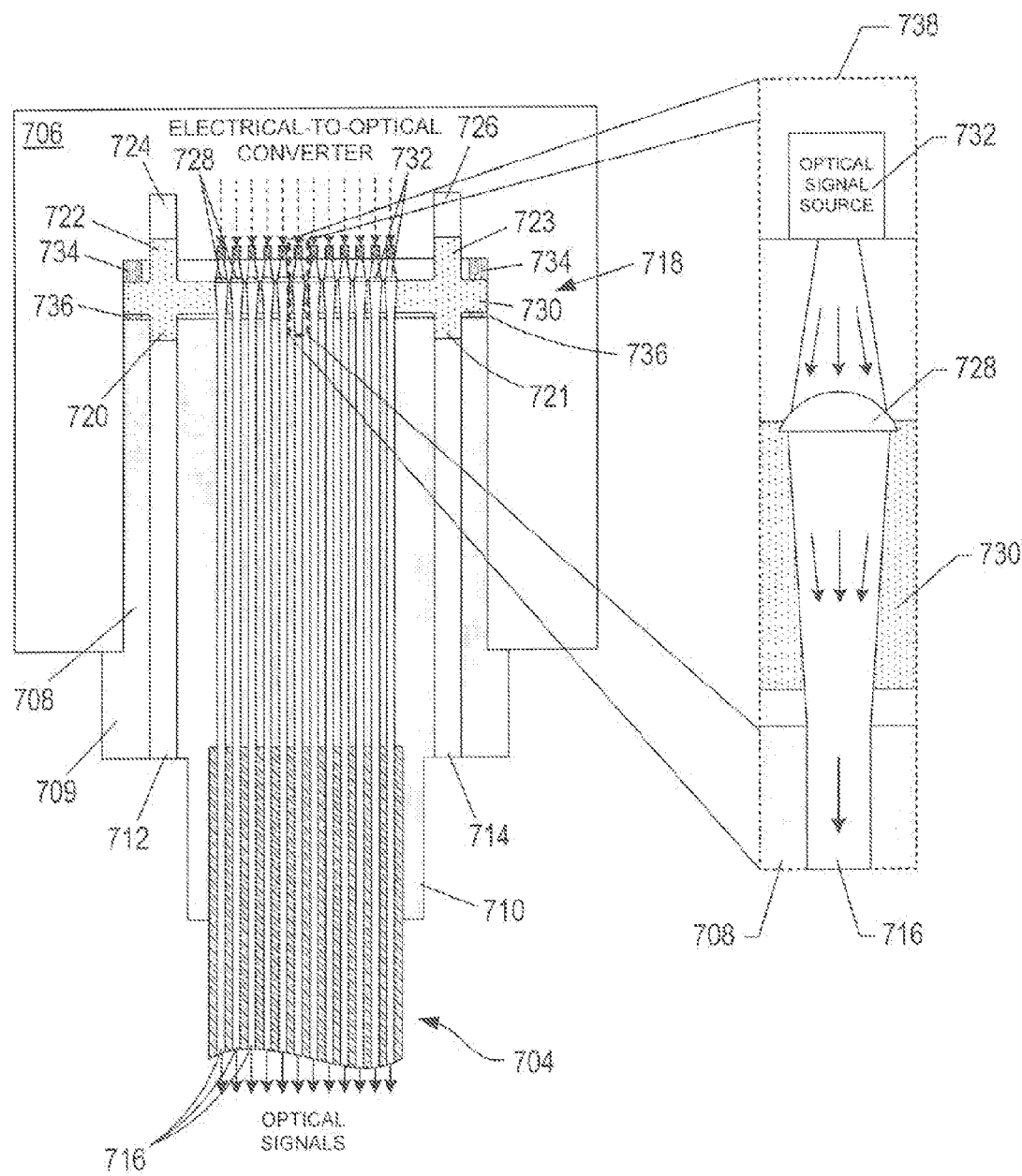
FIG. 7B shows a cross-sectional view of the connector shown in FIG. 7A.

FIG. 7A shows an example of a connector 702 that connects an optical fiber ribbon cable 704 to an EO converter 706. Electronic signals enter the converter 706 and are converted by the converter 706 into optical signals that are sent over the cable 704. FIG. 7B shows a cross-sectional view of the connector 702 inserted into the converter 706 along a line III-III shown in FIG. 7A. In the example of FIG. 7B, the connector 702 is configured in a similar manner to the connector 102. The connector 702 includes a housing 708, a collar 709, and a strain boot 710. The housing 708 includes alignment openings 712 and 714 and optical fiber openings to receive the optical fibers 716 of the cable 704. The connector 702 also includes a multilens array 718 with alignment posts 720 and 721 inserted into alignment openings 712 and 714 and alignment posts 722 and 723 inserted into alignment openings 724 and 726 of the converter 706. Focusing lenses 728 protrude from a surface of a transparent plate 730 and are positioned opposite the ends of the fibers 716. The alignment posts 720-723 maintain alignment of the optical fibers 716, the lenses 728, and an array of optical signal sources 732. The optical signal sources 732 can be vertical-cavity surface-emitting lasers or edge emitting lasers with power supply modulated to generate optical signals. A first standoff frame 734 protects the base fillet of the alignment posts 722 and 723 and protects the lenses 728 of the lens array, and a second standoff frame 736 protects the base fillets of the alignment posts 720 and 721. The thickness of the first standoff 734 is dimensioned so that optical signal emitted from the sources 732 as beams of light are properly focused onto the corresponding lenses 728 of the array of lenses. As shown in enlarged view 738, each beam is transmitted through a lens 728 of the array of lenses and the plate 730 and is focused on the end of an optical fiber 716.

Optical fiber ribbon cables with optical multifiber connectors located at the ends of the cables can be used to optically connect computing devices. Consider, for example, a computing system composed of a number of blades or line cards. The system includes a chassis that can hold multiple blades or cards, provide services such as power, cooling, networking, various interconnects and blade or card management. Each blade or card can be composed of at least one processor, memory, integrated network controllers, and other input/output ports, and each blade or card may include local drives and can connect to a storage pool facilitated by a network-attached storage, Fiber Channel, or iSCSI storage-area network. Certain blades or cards within the blade system can be connected to one another with optical fiber ribbon cables that include optical multifiber connectors located at the ends of the cables, enabling each blade or card to send a high volume of data encoded in optical signals to other blades or cards in the system.

Figure 8B:
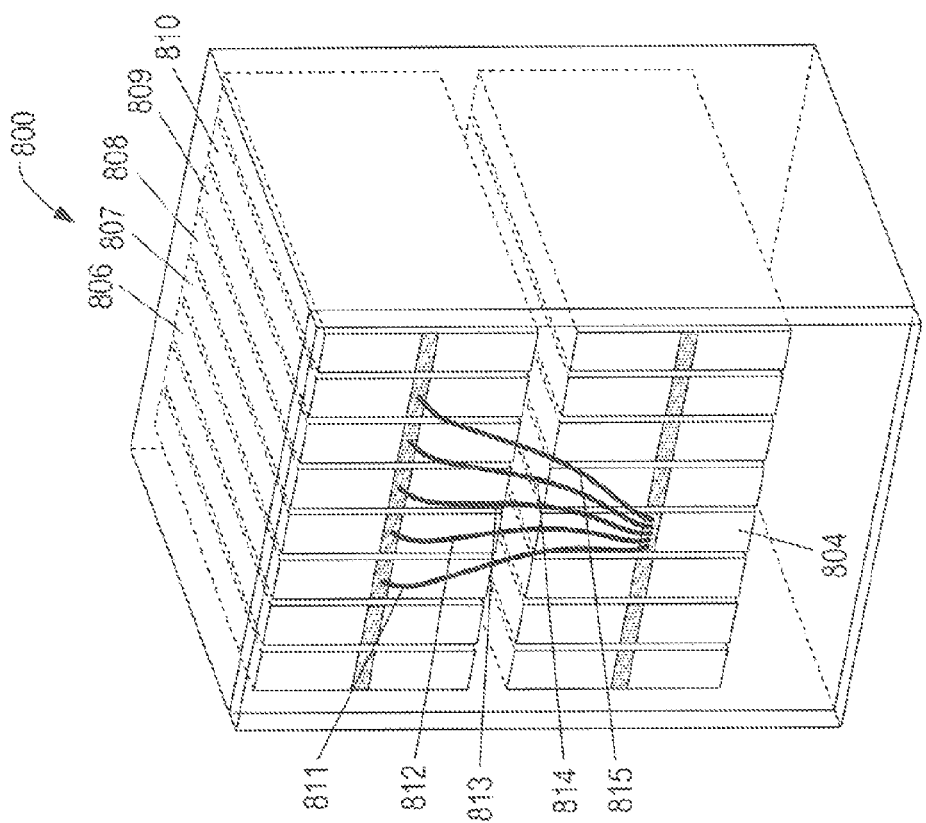
FIG. 8B shows an isometric view of the backplane of the example system shown in FIG. 8A.
Figure 8A:
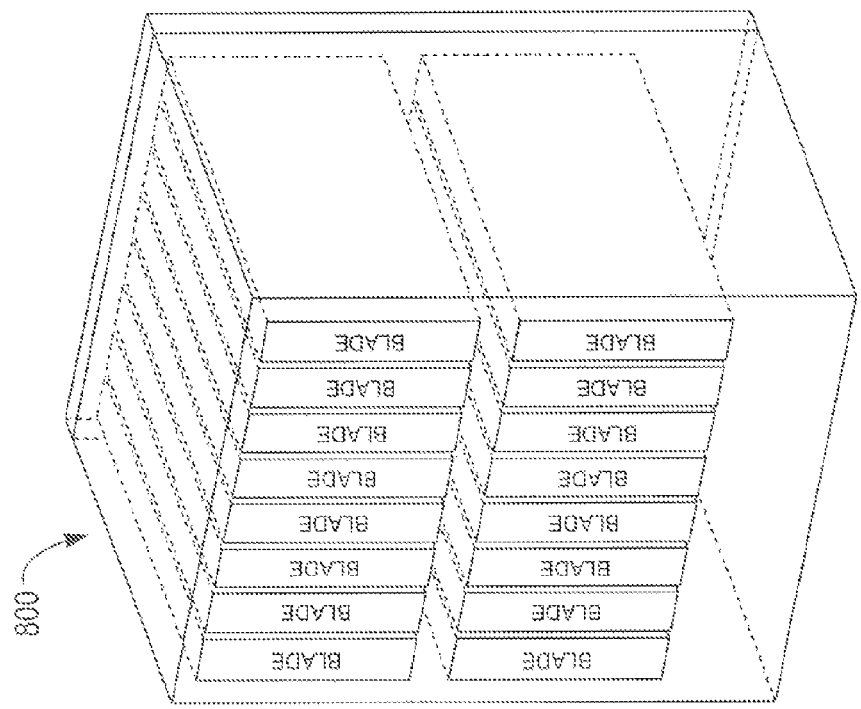
FIG. 8A shows an isometric view of an example blade system.

FIG. 8A shows an isometric view of an example blade system 800 composed of sixteen blades mounted in a blade enclosure or chassis 802. Each blade is connected to a backplane 810 that provides input/output connectivity between the blades. FIG. 8B shows an isometric view of the backplane of the example system 800. In the example of FIG. 8B, a blade 804 is connected to five other blades 806-810 via five separate optical fiber ribbon cables 811-815. Each cable 811 is connected at one end to an OE converter via a connector 600 and is connected at the other end to an EO converter via a connector 700, as described above with reference FIGS. 6 and 7. For example, the cable 811 is used to send optical signals from the blade 804 to the blade 806. In this example, the cable 811 is connected to an OE converter located at the blade 806 and an EO converter located at the blade 804.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the following claims and their equivalents:

The invention claimed is:

1. An optical fiber connector including:
   a transparent plate having a first surface and a second surface opposite the first surface;
   a multilens array having lenses that protrude from the first surface of the transparent plate;
   at least one alignment post that includes a base fillet and protrudes from the first surface of the transparent plate, the at least one alignment post to be inserted into at least one alignment opening of a device;
   at least one alignment post that protrudes from the second surface of the transparent plate;
   a first standoff frame disposed on the first surface and dimensioned to ensure the base fillet of the first surface of the transparent plate does not make contact with a surface of the device when the at least one alignment post protruding from the first surface is inserted into the at least one alignment opening of the device; and
   a second standoff frame disposed on the second surface.

2. The connector of claim 1, includes a multiple termination ferrule having at least one alignment opening to receive the at least one alignment post that protrudes from the second surface and an array of optical fiber openings to receive optical fibers of an optical fiber cable, wherein the array of lenses disposed on the first surface are aligned with the optical fiber openings.

3. The connector of claim 1, wherein the device includes an array of optical-to-electrical converters, each lens of the multilens array located opposite one of optical-to-electric converters.

4. The connector of claim 1, wherein each alignment post that protrudes from the second surface further comprises a base fillet.

5. The connector of claim 1, wherein the lenses of multilens array are molded protuberances of the first surface, wherein the transparent plate, the lenses and the at least one alignment posts of each of the first and second surfaces are molded from the same material.

6. The connector of claim 1, wherein the lenses of the multilens array are adhered to the first surface.

7. The connector of claim 1, wherein the first standoff frame is dimensioned so that optical signals transmitted between the optical connector and the device as beams of light are properly focused onto a corresponding lens of the device.

8. An optical fiber connector including:
a transparent plate comprising:
   a first surface that includes at least one alignment post that protrudes from the first surface and includes a base filet, the at least one alignment post to be inserted into at least one alignment opening of a device; and
   a second surface opposite the first surface and at least one alignment post that includes a base fillet and protrudes from the second surface;
a multilens array that protrudes from the first surface of the transparent plate;
a multiple termination ferrule having at least one alignment opening to receive the at least one alignment post protruding from the second surface and at least one optical fiber opening to receive optical fibers of an optical fiber cable, wherein the lenses of the lens array are aligned with the optical fiber openings; and
a standoff frame disposed between the second surface and the ferrule and dimensioned to ensure the base fillet does not make contact with a surface of the multiple termination ferrule when the at least one alignment post is inserted into the at least one alignment opening of the multiple termination ferrule.

9. The connector of claim 8, including
another standoff frame disposed on the first surface.

10. The connector of claim 8, wherein each alignment post includes a base fillet.

11. The connector of claim 8, wherein the lenses of the lens array are molded protuberances of the first surface.

12. The connector of claim 8, wherein the lenses of the lens array are adhered to the first surface.

13. An optical fiber connector including:
a first standoff with a first surface and a second surface, the first standoff comprising:
   a first multilens array that protrudes from the first surface;
   at least one alignment post that includes a base fillet and protrudes from the first surface; and
   at least one alignment post that includes a base fillet and protrudes from the second surface;
a second standoff with a third surface and a fourth surface, the second standoff comprising:
   a second multilens array that protrudes from the third surface;
   at least one alignment post that includes a base fillet and protrudes from the third surface; and
   at least one alignment post that includes a base fillet and protrudes from the fourth surface; and
a transparent plate having at least one alignment opening arranged between the first standoff and the second standoff, wherein the first multilens array is facing a given surface of the transparent plate and the second multilens array is facing another surface of the transparent plate that is opposite the given surface, wherein a given standoff frame is arranged between the given surface and the first standoff and another standoff frame is arranged between the another surface and the second standoff, each standoff frame dimensioned to ensure a base fillet of an alignment post does not make contact with a surface of the transparent plate.

14. The connector of claim 13, further comprising:
a first multiple termination ferrule comprising:
   at least one alignment opening to receive the at least one alignment post that protrudes from the second surface of the first standoff; and
   at least one optical fiber opening to receive optical fibers of a first optical fiber cable, wherein one or more lenses of the first multilens array of the first standoff are aligned with the optical fiber openings; and
a second multiple termination ferrule comprising:
   at least one alignment opening to receive the at least one alignment post that protrudes from the fourth surface of the second standoff; and
   at least one optical fiber opening to receive optical fibers of a second optical fiber cable, wherein one or more lenses of the second multilens array of the second standoff are aligned with the optical fiber openings.

15. The standoff of claim 14, including:
a third standoff frame disposed between the second surface and the first multiple termination ferrule; and
a fourth standoff frame disposed between the fourth surface and the second multiple termination ferrule.

16. The connector of claim 13, wherein a lens of at least one of the first multilens array and the second multilens array is a collimating lens.

* * * * *